(12) United States Patent
Li et al.

(10) Patent No.: US 10,257,055 B2
(45) Date of Patent: Apr. 9, 2019

(54) SEARCH FOR A TICKET RELEVANT TO A CURRENT TICKET

(71) Applicant: International Business Machines Corporation, Armonk, NY (US)

(72) Inventors: Feng Li, Beijing (CN); Qi Cheng Li, Beijing (CN); Shao Chun Li, Beijing (CN); Rong Liu, Sterling, VA (US); Li Jun Mei, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 753 days.

(21) Appl. No.: 14/876,869

(22) Filed: Oct. 7, 2015

(65) Prior Publication Data

US 2017/0103128 A1  Apr. 13, 2017

(51) Int. Cl.
| G06F 7/00 | (2006.01) |
| G06F 17/30 | (2006.01) |
| H04L 12/24 | (2006.01) |
| G06Q 10/06 | (2012.01) |

(52) U.S. Cl.
CPC .... *H04L 41/5074* (2013.01); *G06F 17/30961* (2013.01); *G06Q 10/06* (2013.01); *H04L 41/12* (2013.01)

(58) Field of Classification Search
CPC ......... G06F 17/30867; G06F 17/30525; G06F 17/30345; H04L 43/16
USPC ....................................................... 707/769
See application file for complete search history.

(56) References Cited

U.S. PATENT DOCUMENTS

| 8,365,019 | B2 | 1/2013 | Sailer et al. | |
| 8,504,679 | B2 | 8/2013 | Spire et al. | |
| 2008/0181100 | A1* | 7/2008 | Yang | H04L 41/0654 370/216 |
| 2008/0228504 | A1* | 9/2008 | Nguyen | G06Q 30/02 705/1.1 |
| 2009/0216697 | A1* | 8/2009 | Beaty | G06N 99/005 706/45 |
| 2009/0310764 | A1* | 12/2009 | Gerhart | G06Q 10/06 379/142.04 |
| 2011/0078514 | A1* | 3/2011 | Scrafford | G06Q 10/00 714/48 |
| 2011/0202484 | A1* | 8/2011 | Anerousis | G06N 7/005 706/12 |
| 2011/0295898 | A1* | 12/2011 | Grabarnik | G06Q 10/103 707/780 |
| 2012/0042318 | A1* | 2/2012 | Doan | G06Q 10/06315 718/103 |
| 2013/0103682 | A1* | 4/2013 | Ghosh | G06F 11/0781 707/731 |

(Continued)

*Primary Examiner* — Binh V Ho
(74) *Attorney, Agent, or Firm* — Cantor Colburn LLP; Vazken Alexanian (57) ABSTRACT

A computer-implemented method for searching for a ticket relevant to a current ticket describing an incident, a system and a computer program product for the same. The method includes extracting a topology of a first application of a server system, the first application being indicated by the current ticket; selecting a second application relevant to the first application from a plurality of candidate applications of the server system, according to the topology; and searching tickets associated with the second application for the ticket relevant to the current ticket.

18 Claims, 4 Drawing Sheets

(56) References Cited

U.S. PATENT DOCUMENTS

| | | | |
|---|---|---|---|
| 2013/0262082 A1* | 10/2013 | McKeeman et al. | G06F 17/27 704/9 |
| 2014/0046988 A1* | 2/2014 | Kojima | G06F 17/30194 707/827 |
| 2014/0129536 A1* | 5/2014 | Anand | G06Q 10/0635 707/706 |
| 2014/0149411 A1* | 5/2014 | Anand | G06F 17/30654 707/737 |
| 2014/0181145 A1* | 6/2014 | Kamsamohideen | G06F 11/0706 707/776 |
| 2014/0250125 A1 | 9/2014 | Stuempfle et al. | |
| 2014/0280068 A1* | 9/2014 | Dhoopar | G06F 17/30554 707/722 |
| 2015/0067043 A1* | 3/2015 | Agarwal | G06Q 10/06 709/204 |
| 2015/0113008 A1* | 4/2015 | Deshmukh | H04L 67/2819 707/754 |
| 2015/0113628 A1* | 4/2015 | Deshmukh | H04L 41/5074 726/10 |
| 2015/0302337 A1* | 10/2015 | Li | G06Q 10/06393 705/7.39 |
| 2017/0068721 A1* | 3/2017 | Chafle | G06F 11/00 |
| 2018/0062912 A1* | 3/2018 | Anerousis | H04L 41/065 |

* cited by examiner

| INCIDENT_ID: IN1 | |
|---|---|
| Severity : 1 | Open Time: 2014-12-9 15:03 |
| Assignee: Joe | Support Team: Web Application Team |
| Application: A1 | |
| Description: Middleware M1 report cannot be shown on Server S1. | |

SEARCH FOR A TICKET RELEVANT TO A CURRENT TICKET

FIELD OF THE INVENTION

The present disclosure relates to a solution to a ticket which can be generated in, for example, a server system, and more specifically, to a computer-implemented method, a system and a computer program product for searching for a ticket relevant to a current ticket describing an incident.

BACKGROUND

A server system usually includes components including a server, an operating system ("OS") installed on the server, a middleware deployed on the server, and an application installed in the middleware and providing a service. During an operation of the server system, an incident can occur due to various reasons. Accordingly a ticket describing the incident is generated manually by, for example, an administrator of the system or automatically by the server system. The ticket describes a symptom of the incident and a component having the symptom, and also indicates an application associated with the ticket.

Conventionally, in order to locate and remove a cause resulting in the incident associated with the current ticket, all tickets associated with the application indicated by the current ticket are searched by using the symptom and/or a name of the component as keywords to find a ticket relevant to the current ticket, so that a solution for the relevant ticket can be checked to see whether it can be used for the current ticket. However, this method often obtains a large number of tickets, which requires much time to analyze them, and moreover, the obtained tickets are often found to be actually not relevant to the current ticket and thus useless for the current ticket. On the other hand, at many times it can be found that tickets associated with other applications than the current application are helpful in root cause analysis for the incident associated with the current application.

SUMMARY OF THE INVENTION

According to an embodiment of the present disclosure, there is provided a computer-implemented method for searching for a ticket relevant to a current ticket describing an incident. In the method, a topology of a first application of a server system can be extracted, where the first application is indicated by the current ticket. A second application relevant to the first application can be selected from a plurality of candidate applications of the server system according to the topology. Then, tickets associated with the second application can be searched for the ticket relevant to the current ticket.

According to another embodiment of the present disclosure, there is provided a system for searching for a ticket relevant to a current ticket describing an incident, including: at least one processor; a memory coupled to at least one of the processors; a set of computer program instructions stored in the memory, which, when executed by at least one of the processors, perform the following actions. A topology of a first application of a server system can be extracted, where the first application is indicated by the current ticket. A second application relevant to the first application can be selected from a plurality of candidate applications of the server system according to the topology. Then, tickets associated with the second application can be searched for the ticket relevant to the current ticket.

According to a yet another embodiment of the present disclosure, there is provided a computer program product for searching for a ticket relevant to a current ticket describing an incident. The computer program product includes a computer readable storage medium having thereon first program instructions, second program instructions and third program instructions. The first program instructions are executable by a processor to cause the processor to extract a topology of a first application of a server system, where the first application is indicated by the current ticket. The second program instructions are executable by the processor to cause the processor to select a second application relevant to the first application from a plurality of candidate applications of the server system, according to the topology. The third program instructions are executable by the processor to cause the processor to search tickets associated with the second application for the ticket relevant to the current ticket.

DETAILED DESCRIPTION OF THE PREFERRED EMBODIMENTS

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
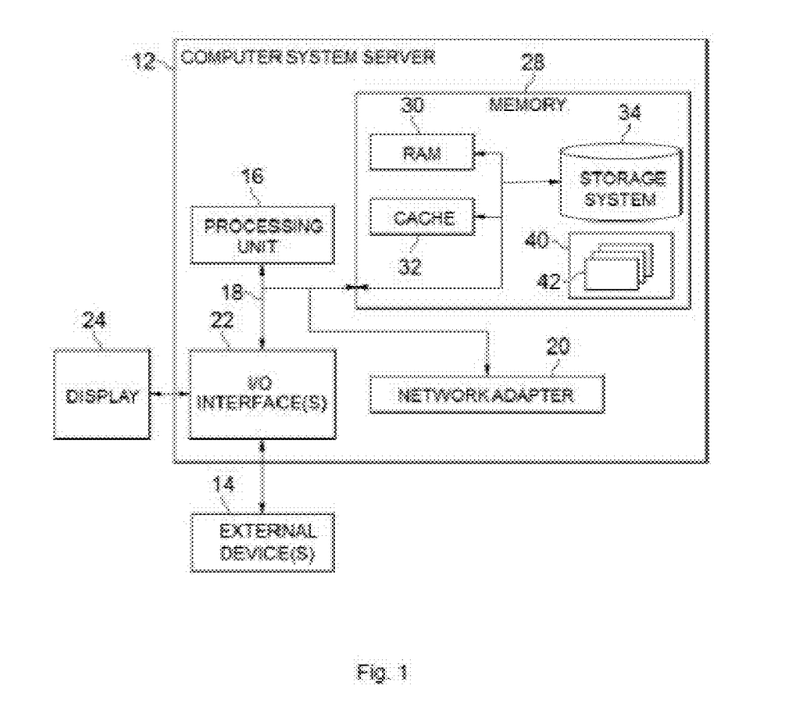
FIG. 1 shows an exemplary computer system which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 can include, but are not limited to, at least one processor or processing unit 16, a system memory 28, and a bus 18 that couples various system components including system memory 28 to processor 16.

Bus 18 represents at least one of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by at least one data media interface. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, at least one application program, other program module, and program data. Each operating system, at least one application program, other program modules, and program data or some combination thereof, can include an implementation of a networking environment. Program modules 42 generally carry out the functions and/or methodologies of embodiments of the invention as described herein.

Computer system/server 12 can also communicate with at least one external device 14 such as a keyboard, a pointing device, a display 24, etc.; at least one device that enables a user to interact with computer system/server 12; and/or any devices (e.g., network card, modem, etc.) that enable computer system/server 12 to communicate with at least one other computing device. Such communication can occur via Input/Output (I/O) interfaces 22. Computer system/server 12 can communicate with at least one network such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

A server (or a computer system) described above can be configured with an operating system, a middleware and an application, forming a server system. Specifically, the operating system can be installed on the server, the middleware can be deployed on the server, and the application can be installed in the middleware, so that the server system includes the operating system, the server, the middleware and the application as its components. There can be at least one server, at least one middleware and at least one application in a server system according to actual needs. Additionally, the server can be a physical machine so that the middleware is deployed on the physical machine, or can be a physical machine plus a virtual machine, in which case the middleware is deployed on the virtual machine.

Figure 2:
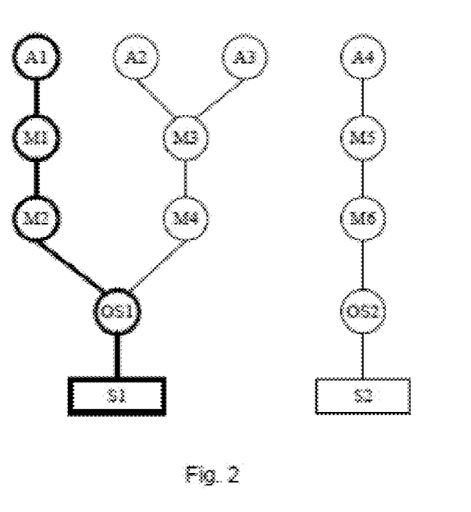
FIG. 2 shows an exemplary server in which embodiments of the present disclosure can be applied.

After the configuration of the server system is completed, the components included in the server system, i.e. the operating system, the server, the middleware and the application, and the relationship among the components are known. The relationship among the components can indicate that one component contains another component or that another component is installed/deployed on the one component, etc., and a topology of the server system can be determined according to the relationship among the components. FIG. 2 shows an exemplary topology of a server system. The server system includes applications A1-A4, middleware M1-M6, operating systems OS1 and OS2, and servers S1 and S2. In the topology shown in FIG. 2, A1 is deployed on M1, M1 is deployed on M2, M2 is deployed on OS1, and OS1 is installed on S1; A2 and S3 are deployed on M3, M3 is deployed on M4, M4 is deployed on OS1; A4 is deployed on M5, M5 is deployed on M6, M6 is deployed on OS2, and OS2 is installed on S2. Additionally, in the exemplary topology, the applications, the middleware, the operating systems and the servers are arranged from a highest level to a lowest level. A list of the components included in the server system can be stored for subsequent use. For example, the list of the components can be stored in a configuration management database (CMDB) and can act as a dictionary from which related information, such as names, configurations, functions and the like, of the respective components can be retrieved when needed. The relationship among the components can also be recorded in the CMDB together with the list of the components in any suitable manner.

Figure 3:
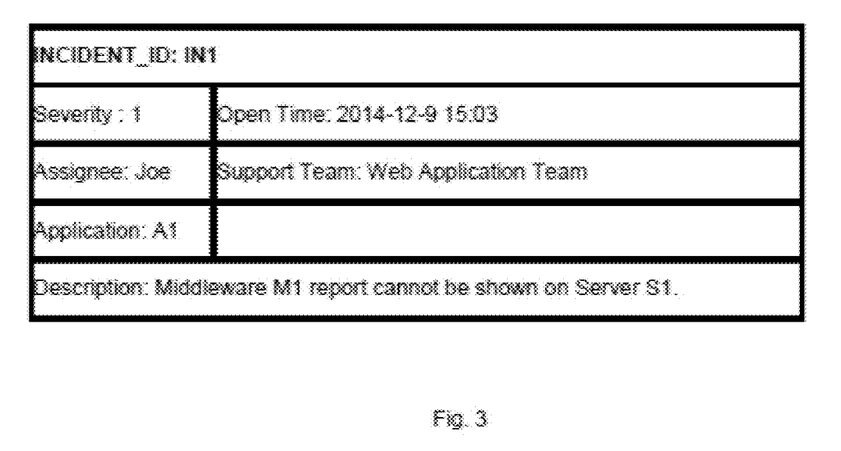
FIG. 3 shows an exemplary ticket for an incident generated in the server system shown in FIG. 2.

As described above, when an incident occurs in the server system during an operation of the system, a ticket describing the incident is generated. The ticket can include basic information of the incident and context information of the incident. The basic information can be provided in a structured language, and can include, for example, at least one of an ID of the ticket, a time at which the ticket is generated, severity of the incident, and an application field indicating an application associated with the ticket. The context information can be provided in an unstructured language, such as in a natural language, and can include an expression (e.g. a word, a phrase or a sentence) describing a symptom of the incident and indicate at least one component associated with the symptom, such as a server, a middleware or an application where the symptom occurs or is considered to occur. The expression describing the symptom can have a predetermined format. For example, the expression describing the symptom can be a combination of a name and a descriptive word, where the name is a name of the component associated with the symptom, such as "A1" or "application A1", "M2" or "middleware M2", or "S1" or "server S1" shown in FIG. 2, and the descriptive word can be a word describing various abnormal status or events, such as "down", "not available/unavailable" or "lost". FIG. 3 shows an exemplary ticket for an incident generated in the server system shown in FIG. 2. The exemplary ticket includes basic information including an incident ID "IN1", severity "1", a time at which the ticket is generated "2014-12-9 15:03", an assignee "Joe", a support team "Web Application Team", and an application field indicating an application "A1" associated with the ticket. The exemplary ticket further includes context information including an expression indicating a symptom "Middleware M1 report cannot be shown on Server S1", where the context information indicates components associated with the symptom "Middleware M1" and "Server S1". From the ticket per se, the application associated with the ticket and the component related to the symptom can be easily identified. It is to be appreciated that the ticket can adopt other suitable form than that shown in FIG. 3, and the content of the ticket can also vary according to actual needs.

In order to locate and eliminate a cause for an incident associated with the current ticket, tickets which have been generated for the application indicated by the current ticket can be searched to find a relevant ticket to the current ticket. If a solution for the relevant ticket can be used to remove the incident associated with the current ticket, the current ticket can be handled quickly. However, if the solution for the relevant ticket is useless in resolving the incident associated with the current ticket, tickets generated for other applications in the server system than the current application (called candidate applications below for convenience of description) can be searched to find a relevant ticket which can be helpful for the current ticket. This can be accomplished by embodiments of the present disclosure described below.

With reference now to the accompanying drawings, a computer-implemented method and a device for searching for a ticket relevant to a current ticket, and a system and a computer program product for searching for a ticket relevant to a current ticket according to embodiments of the present disclosure will be described in detail. The ticket can be generated in the server system or any other suitable system.

Figure 4:
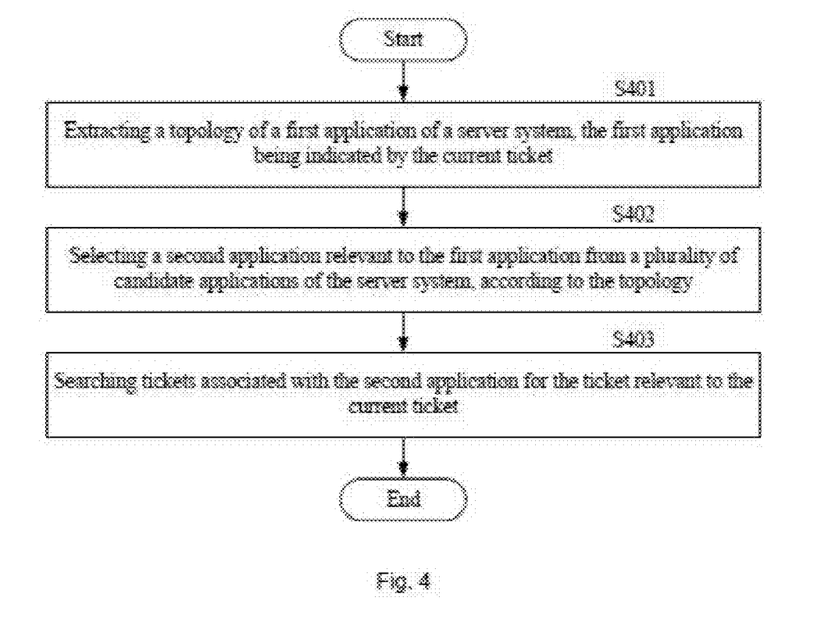
FIG. 4 shows a flow diagram for a computer-implemented method for searching for a ticket relevant to a current ticket according to an embodiment of the present disclosure.

The computer-implemented method for searching for a ticket relevant to a current ticket according to an embodiment of the present disclosure will be described below with reference to FIG. 4. As shown in FIG. 4, in step S401, a topology of an application (called a first application below for convenience of description) of the server system can be extracted, where the first application is indicated by the current ticket.

In the embodiment of the present disclosure, the topology of the first application can be a complete topology from the first application at a highest level of the topology to a server at a lowest level, which includes the first application and other component(s) indicated by the current ticket. In other embodiments, the topology of the first application can be a part of the complete topology described above.

Specifically, there is an application field in the current ticket indicating the application associated with the current ticket, and the context information of the current ticket indicates at least one component associated with the symptom. Based on the application and the component indicated in the current ticket and the information regarding the topology of the server system stored in the CMDB, the topology of the current application can be extracted. Take the current ticket shown in FIG. 3 as an example. The current ticket shown in FIG. 3 indicates the first application A1 associated with the current ticket, and also indicates the middleware M1 and the server S1 associated with the symptom, therefore the topology of the first application indicated by the current ticket shown in FIG. 3 can be determined from the first application A1, the middleware M1 and the server S1, and the information stored in the CMDB, as shown by a bold part of the topology shown in FIG. 2.

Continuing with FIG. 4, in step S402, an application relevant to the first application (called a second application below for convenience of description) can be selected from a plurality of candidate applications of the server system, according to the extracted topology of the first application. In the embodiment, the second application relevant to the first application can be a candidate application similar to the first application.

The selection of the second application can be performed based on a similarity degree between each candidate application and the first application. Briefly, a similarity degree between each candidate application and the first application can be calculated according to the topology of the first application. Then, at least one candidate application, a similarity degree between which and the first application is greater than a first threshold, can be selected from the plurality of candidate applications, as the second application relevant to the first application.

In an implementation, the similarity degree between each candidate application and the first application can be calculated based on a distance between the candidate application and the first application. It is to be noted that the application per se is not considered when the similarity degree between each candidate application and the first application is calculated, because different applications differ from each other greatly which will improperly affect accuracy of the calculated similarity degree.

Figure 5A:
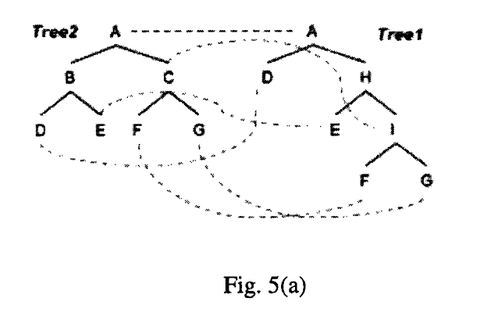
FIG. 5(a) shows how to determine a node in a candidate tree which corresponds to a node in a first tree according to an embodiment of the present disclosure.
Figure 5B:
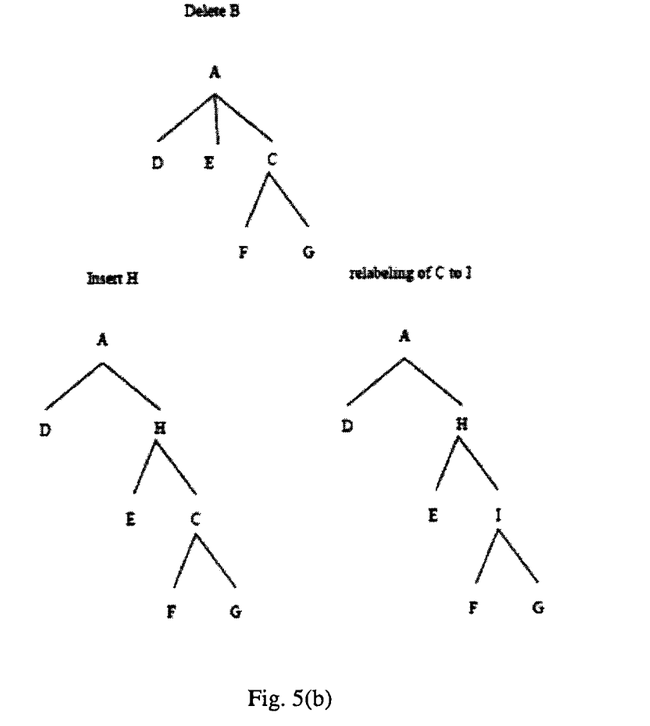
FIG. 5(b) shows how to determine a node in a candidate tree which corresponds to a node in a first tree according to an embodiment of the present disclosure.

Specifically, a corresponding node in a topology of the candidate application (also called a candidate topology) can be firstly determined for each node in the topology of the first application (also called a first topology). The corresponding node in the candidate topology can be determined in various manners. For example, with respect to each node in the first topology, a corresponding node in the candidate topology can be determined by using a Tree Edit Distance method. In this method, the first topology can be regarded a first tree, and the candidate topology can be regarded as a candidate tree. A tree edit distance between the first tree and the candidate tree is defined as a minimum number of tree edit operations, including at least one of a node insertion, a node deletion, and a node label substitution, performed on the candidate tree so as to transform the candidate tree into the first tree. With respect to a node in the first topology, its corresponding node in the candidate topology can be determined as a node of the candidate tree which is transformed into the node in the first tree when transformation is performed on the basis of the tree edit distance. FIG. 5(*a*) and FIG. 5(*b*) show how to determine a node in a candidate tree which corresponds to a node in the first tree. As shown in FIG. 5(*a*), a first tree is Tree1, and a candidate tree is Tree2. The tree edit distance between the two trees is 3. In this case, through three tree edit operations, including an operating of deleting node B of Tree2, inserting node H into Tree2, and relabeling node C in Tree2 to node I, as shown in FIG. 5(*b*), the candidate tree Tree2 can be transformed into Tree1. Then, the corresponding node in Tree2 for each node in Tree1 can be determined through this transformation, as shown by pairs of nodes connected via dotted lines in FIG. 5(*a*).

After the corresponding node in the candidate topology is determined for each node in the first topology, a distance between each node, except for a node corresponding to the first application, in the first topology and its corresponding node in the candidate topology can be calculated. A distance between a node in the first topology (except for the node corresponding to the first application, in other words, the first application per se) and its corresponding node in the candidate topology can be determined in various manners. In the embodiment, the distance between the two nodes can be determined via a Jaccard method, in which case a Jaccard distance between the two nodes can be used as the distance between the two nodes. However, it is to be appreciated that other distances can be used in other embodiments.

The Jaccard distance between the node in the first topology and its corresponding node in the candidate topology can be determined according to tickets (i.e. history tickets) associated with the applications.

Specifically, tickets associated with the first application can include tickets related to the node in the first topology and ticket unrelated to the node in the first topology, and tickets associated with the candidate application can include tickets related to the corresponding node in the candidate topology and tickets unrelated to the corresponding node in the candidate topology. Accordingly, a first set ST1 including the tickets related to the node, except for the node corresponding to the first application, in the first topology, a second set ST2 including tickets related to the corresponding node in the candidate topology, a third set ST3 including tickets unrelated to the node, except for the node corresponding to the first application, in the first topology, and a fourth set ST4 including tickets unrelated to the corresponding node in the candidate topology can be determined.

Then, tickets in the second set ST2 which are relevant to the tickets in the first set ST1, and tickets in the fourth set ST4 which are relevant to the tickets in the third set ST3 can be determined. Briefly, a distance between each ticket in the second set ST2 and each ticket in the first set ST1 can be calculated, and a ticket in the second set ST2 can be determined as a ticket which is relevant to a ticket in the first set ST1 if a distance between the two tickets is less than a second threshold. Additionally, a distance between each ticket in the third set ST3 and each ticket in the fourth set ST4 can be calculated, and a ticket in the fourth set ST4 can be determined as a ticket which is relevant to a ticket in the third set ST3 if a distance between the two tickets is less than a third threshold. In the embodiment, the second threshold can be greater than the third threshold, because the tickets related to the node are more important than the tickets which are not related to the node.

Specifically, a distance between a ticket in ST2 and a ticket in ST1 can be calculated as follows. Firstly, vectors can be created for the ticket in ST2 and the ticket in ST1, respectively. Each vector can include keywords extracted from the two tickets. The number of elements of each vector is equal to a total number of different components and different symptoms included in the two tickets, each element of the vector corresponds to one component or symptom, and a value of each element indicates whether the corresponding component or symptom exists in the ticket to which the vector corresponds. For example, a value of an element can be set to 1 indicating a corresponding component or symptom exists in the corresponding ticket, or 0 indicating the corresponding component does not exist in the corresponding ticket. Then, a cosine value COS between the vector for the ticket in ST2 and the vector for the ticket in ST1 can be calculated, and the distance between the ticket in ST2 and the ticket in ST1 can be calculated as 1-COS. For example, if the ticket ST2 indicates components "someAPP", "server xyz", "server xyz2" and "MQ" and a symptom "MQ connection is lost", and the ticket in ST1 indicates components "someAPP", "server xyz2", "server xyz3", "WAS" and "MQ connection lost", then the vectors for the ticket in ST2 and the ticket in ST1 can be represented as (1, 1, 1, 0, 1, 0, 1, 0) and (1, 0, 1, 1, 0, 1, 1, 0) respectively. Therefore, a cosine value COS between the two vectors is 0.6, and the distance between the two vectors is 1−0.6=0.4. In this way, the distance between each ticket in ST2 and each ticket in ST1 can be obtained. Similarly, the distance between each ticket in ST4 and each ticket in ST3 can be obtained.

Then, the distance between each node, except for the node corresponding to the first application, in the first topology (i.e. the topology of the first application) and its corresponding node in the candidate topology of the candidate application can be calculated according to a number of the tickets in the second set ST2 which are relevant to the tickets in the first set ST1 and a number of the tickets in the fourth set ST4 which are relevant to the tickets in the third set ST3. For example, the distance between the two nodes can be expressed by a Jaccard distance between the two nodes. In this case, the Jaccard distance ("JD") between the two nodes can be calculated by using the following equation:

$$JD = 1 - \frac{N1 + N2}{N1' + N2N}$$

where N1 is the number of the tickets in the second set ST2 which are relevant to the tickets in the first set ST1, N2 is the number of the tickets in the fourth set ST4 which are relevant to the tickets in the third set ST3, NI is the total number of the tickets in the first set ST1 and the second set St2, and N2' is the total number of the tickets in the third set ST3 and the fourth set ST4. It is to be appreciated that the above equation It is to be appreciated that the above method for calculating the Jaccard distance between the node is exemplary, not limitative. In other embodiment, the third set and the fourth set cannot be considered when calculating the distance, in which cases terms related to the two set in the above equation can be omitted.

Returning to step S402 shown in FIG. 4, after the distance between each node, except for the node corresponding to the first application, in the first topology and the corresponding node in the candidate topology is obtained, the similarity degree between the candidate application and the first application can be calculated according to the distance.

In the embodiment, each node in the first topology can be assigned a weight, where a weight for a node indicated by the current ticket can be assigned a larger weight, whereas a weight for a node which is not indicated by the current ticket can be assigned a smaller weight. This is because the node indicated by the current ticket is more important than the node which is not indicated by the current ticket and thus should be considered more significantly than the latter node when the distance between the two applications is calculated. Then, the distance between the each node, except for the node corresponding to the first application, in the first topology and the corresponding node in the candidate topology can be multiplied by a weight for the each node, so as to obtain a weighted distance corresponding to the each node. The similarity degree between the candidate application and the first application can be calculated based on a sum of the weighted distances corresponding to the respective nodes, except for the node corresponding to the first application, in the first topology. For example, the similarity degree between the candidate application and the first application can be calculated as a difference between 1 and a sum of the weighted distances corresponding to the respective nodes, except for the node corresponding to the first application, in the first topology.

In this way, the similarity degree between each candidate application and the first application can be determined. Then, at least one candidate application, a similarity degree between which and the first application is greater than the first threshold, from the plurality of candidate applications, as the second application relevant to the first application. The first threshold can be set according to actual needs.

Continuing with FIG. 4, in step S403, tickets associated with the second application can be searched for the ticket relevant to the current ticket. In the embodiment, the ticket relevant to the current ticket can be a ticket similar to the current ticket. The ticket similar to the current ticket can be found in various manners. In an implementation, a replacement ticket can be generated by replacing names of at least one component included in the current ticket, e.g. at least one component described in the context information of the current ticket, with names of corresponding components in the topology of the second application. Specifically, all nodes in the topology of the first application, including the at least one component included in the current ticket, has corresponding nodes in the topology of the second topology, respectively. Therefore, each component included in the current ticket has a corresponding component in the topology of the second application. Accordingly, the names of the components included in the current ticket can be replaced with the names of corresponding components in the topology of the second application.

Then, a ticket belonging to a same topic as the replacement ticket can be found as the ticket similar to the current ticket. In this example, the replacement ticket and all the tickets associated with the second application can be grouped and analyzed to determine their respective topics. For example, a statistic model such as a Latent Dirichlet Allocation model can be applied to analyze the topics of the tickets. Then, the ticket associated with the second application, which belongs to the same topic as the replacement ticket, can be determined as the ticket similar to the current ticket. A particular method for performing the topic analysis on the tickets is known in the art, thus a description thereof is omitted here for simplicity.

As another example, a ticket having a similarity degree with the replacement ticket greater than a fourth threshold (called the fourth threshold below for convenience of description) can be found as the ticket similar to the current ticket. The fourth threshold can be any suitable value set as needed. In this example, as described above, components mentioned in each ticket associated with the second application and symptoms in each ticket associated with the second application are extracted. Then, a similarity degree between the replacement ticket and each ticket associated with the second application is evaluated based on the component and the symptom indicated in the context information extracted from the replacement ticket and the components and symptoms extracted from each ticket associated with the second application.

Specifically, a vector can be created for each of the replacement ticket and the tickets associated with the second application in the manner described above with reference to step S402. Then, a cosine value between the vector for each ticket associated with the second application and the vector for the replacement ticket can be calculated as a similarity degree of the two tickets. If a similarity degree between the two tickets is greater than the fourth threshold, the ticket associated with the second application can be determined as the ticket similar to the current ticket.

Figure 6:
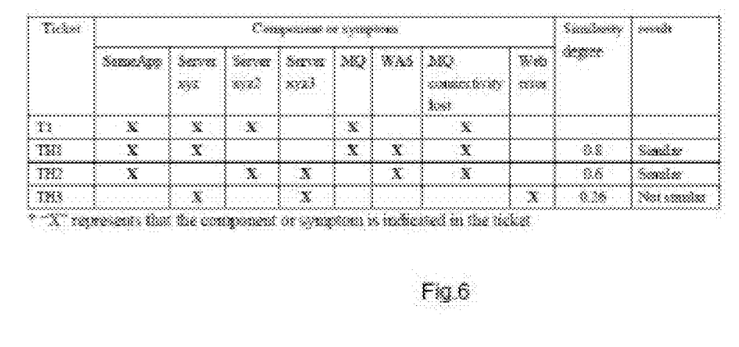
FIG. 6 shows schematically calculation results of several tickets according to an embodiment of the present disclosure.

The calculation of the similarity degree will be described in conjunction with an example shown in FIG. 6 hereinafter. Assume that the replacement ticket T1 indicates components "someAPP", "server xyz", "server xyz2" and "MQ" and a symptom "MQ connection is lost", a first ticket associated with the second application TH1 indicates components "someAPP", "server xyz", "MQ", "WAS" and "MQ connection lost", a second ticket associated with the second application TH2 indicates components "someAPP", "server xyz2", "server xyz3", "WAS" and "MQ connection lost", and a third ticket associated with the second application TH3 indicates components "server xyz", "server xyz3", and "web error". Then, the vectors for the replacement ticket and the first to third tickets associated with the second application can be represented as (1, 1, 1, 0, 1, 0, 1, 0), (1, 1, 0, 0, 1, 1, 1, 0), (1, 0, 1, 1, 0, 1, 1, 0), and (0, 1, 0, 1, 0, 0, 0, 1). Additionally, assume that the fourth threshold is 0.5. Then, a cosine value between the vector of the replacement ticket and each ticket associated with the second application is calculated as their similarity degree. In this example, the similarity degrees between the replacement ticket and the three tickets associated with the second application are 0.8. 0.6 and 0.26. Then, the ticket TH1 and the ticket TH2 can be determined as the similar tickets because their similarity degrees are greater than 0.5, whereas the ticket TH3 is not the similar ticket because its similarity degree is not greater than 0.5, as shown in FIG. 6. It is to be appreciated that the above method for calculating the similarity degree is illustrative, and other variant of the method can be used. For example, each component or symptom in the replacement or the ticket associated with the second application can be assigned a weight, indicating an influence of the component or symptom on the similarity degree, and the weight of the component or symptom can be multiplied to a value (e.g. 1 or 0) of an element corresponding to the component or symptom, so that the weight is taken into account when the similarity degree is calculated. The weight can be assigned by taking various factors into account. For example, if the symptom has a high confidence, e.g. is input by an expert instead of a beginner, the weight assigned to the symptom can be high. As an example, if the component indicated in the ticket is more important than other components, the weight assigned to the component can be higher than the other components.

With the above method, when the incident occurs in the server system, tickets associated with similar applications to the current application can be searched for a similar ticket to the current ticket, so that more suitable ticket can be found to help to solve the incident indicated in the current ticket.

The respective embodiments for implementing the method of the present disclosure have been described with reference to the accompanying drawings hereinbefore. The above method can be implemented in software, in hardware, or in a combination thereof. Further, implementing the respective steps in the above method in software, in hardware, or in a combination thereof, a device for searching for information related to an incident generated in a server system based on the same inventive concept can be provided. Even if a hardware configuration of the device is the same as that of a general-purpose processing device, the device will exhibit characteristics different from the general-purpose processing device due to a function of software contained therein, so as to form the device according to the embodiment of the present disclosure. The device of the present disclosure includes a plurality of units or modules, which are configured to execute corresponding steps. Those skilled in the art can understand how to write a program to implement actions of the units or modules by reading the present specification.

Figure 7:
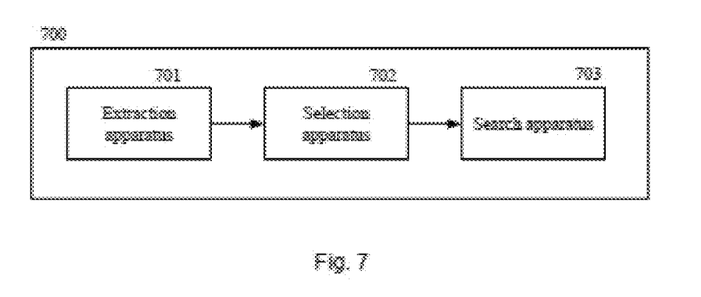
FIG. 7 shows a block diagram of a device for searching for a ticket relevant to a current ticket according to an embodiment of the present disclosure.

With reference now to FIG. 7, the device for searching for a ticket relevant to a current ticket according to an embodiment of the present disclosure will be described. Since the device and the method are based on the same inventive concept, the same or corresponding implementation details in the above method are also applicable to the device corresponding to the above method, and these implementation details will not be described below because they have been described in the above in detail and completely.

As shown in FIG. 7, the device 700 for searching for a ticket relevant to a current ticket according to the embodiment of the present disclosure can include an extraction apparatus 701, a selection apparatus 702, and a search apparatus 703.

The extraction apparatus 701 can extract a topology of a first application of the server system, where the first application is indicated by the current ticket. In the embodiment of the present disclosure, the topology of the first application can be a complete topology from the first application at a highest level of the topology to a server at a lowest level, which includes the first application and other component(s) indicated by the current ticket. In other embodiments, the topology of the first application can be a part of the complete topology described above.

Specifically, the extraction apparatus 701 can extract the topology of the current application based on the application and the component indicated in the current ticket and the information regarding the topology of the server system stored in the CMDB, as described above.

The selection apparatus 702 can select an application relevant to the first application (called a second application below for convenience of description) from a plurality of candidate applications of the server system, according to the extracted topology of the first application. In the embodiment, the second application relevant to the first application can be a candidate application similar to the first application.

Specifically, the selection apparatus 702 can perform the selection of the second application based on a similarity degree between each candidate application and the first application. Briefly, the selection apparatus 702 can calculate a similarity degree between each candidate application and the first application according to the topology of the first application. Then, the selection apparatus 702 can select at least one candidate application, a similarity degree between which and the first application is greater than a first threshold, from the plurality of candidate applications, as the second application relevant to the first application.

The selection apparatus 702 can calculate the similarity degree between each candidate application and the first application according to the topology of the application indicated by the current ticket. In an implementation, the selection apparatus 702 can calculate the similarity degree between each candidate application and the first application based on a distance between the candidate application and the first application. Additionally, in the embodiment, the application per se is not considered when the similarity degree between each candidate application and the first application is calculated, because different applications differ from each other greatly which will affect accuracy of the calculated similarity degree.

Specifically, the selection apparatus 702 can determine a corresponding node in a topology of the candidate application (also called a candidate topology) can be firstly determined for each node in the topology of the first application (also called a first topology). The corresponding node in the candidate topology can be determined in the manners described above. For example, with respect to each node in the first topology, a corresponding node in the candidate topology can be determined by using a Tree Edit Distance method.

After the corresponding node in the candidate topology is determined for each node in the first topology, the selection apparatus 702 can calculate a distance between each node, except for a node corresponding to the first application, in the first topology and its corresponding node in the candidate topology. A distance between a node in the first topology (except for the node corresponding to the first application, in other words, the first application per se) and its corresponding node in the candidate topology can be determined in various manners. In the embodiment, the distance between the two nodes can be determined via a Jaccard method, in which case a Jaccard distance between the two nodes can be used as the distance between the two nodes. However, it is to be appreciated that other distances can be used in other embodiments.

In the embodiment, the Jaccard distance between the node in the first topology and its corresponding node in the candidate topology can be determined by the selection apparatus 702 according to tickets (i.e. history tickets) associated with the applications.

Specifically, a first set ST1 including the tickets related to the node, except for the node corresponding to the first application, in the first topology, a second set ST2 including tickets related to the corresponding node in the candidate topology, a third set ST3 including tickets unrelated to the node, except for the node corresponding to the first application, in the first topology, and a fourth set ST4 including tickets unrelated to the corresponding node in the candidate topology can be determined by the selection apparatus 702.

Then, the selection apparatus 702 can determine tickets in the second set ST2 which are relevant to the tickets in the first set ST1, and tickets in the fourth set ST4 which are relevant to the tickets in the third set ST3. In the embodiment, a ticket in ST2 which is relevant to a ticket in ST1 can be a ticket in ST2 which is similar to the ticket in ST1, and a ticket in ST4 which is relevant to a ticket in ST3 can be a ticket in ST4 which is similar to the ticket in ST3. Briefly, a distance between each ticket in the second set ST2 and each ticket in the first set ST1 can be calculated by the selection apparatus 702, and the selection apparatus 702 can determine a ticket in the second set ST2 as a ticket which is relevant to a ticket in the first set ST1 if a distance between the two tickets is less than a second threshold. Additionally, a distance between each ticket in the third set ST3 and each ticket in the fourth set ST4 can be calculated by the selection apparatus 702, and the selection apparatus 702 can determine a ticket in the fourth set ST4 as a ticket which is relevant to a ticket in the third set ST3 if a distance between the two tickets is less than a third threshold. In the embodiment, the second threshold can be greater than the third threshold.

Specifically, the selection apparatus 702 can calculate a distance between a ticket in ST2 and a ticket in ST1 as follows. Firstly, the selection apparatus 702 can create vectors for the ticket in ST2 and the ticket in ST1, respectively. Each vector can include keywords extracted from the two tickets. The number of elements of each vector is equal to a total number of different components and different symptoms included in the two tickets, each element of the vector corresponds to one component or symptom, and a value of each element indicates whether the corresponding component or symptom exists in the ticket to which the vector corresponds. For example, a value of an element can be set to 1 indicating a corresponding component or symptom exists in the corresponding ticket, or 0 indicating the corresponding component does not exist in the corresponding ticket. Then, the selection apparatus 702 can calculate a cosine value COS between the vector for the ticket in ST2 and the vector for the ticket in ST1, and then calculate the distance between the ticket in ST2 and the ticket in ST1 as 1-COS. Similarly, the distance between each ticket in ST4 and each ticket in ST3 can be obtained by the selection apparatus 702.

Then, the selection apparatus 702 can calculate the distance between each node, except for the node corresponding to the first application, in the first topology (i.e. the topology of the first application) and its corresponding node in the candidate topology of the candidate application according to a number of the tickets in the second set ST2 which are relevant to the tickets in the first set ST1 and a number of the tickets in the fourth set ST4 which are relevant to the tickets in the third set ST3. The selection apparatus 702 can calculate the distance in the manner described above, and a detailed description thereof is omitted here.

After the distance between the each node, except for the node corresponding to the first application, in the first topology and the corresponding node in the candidate topology is obtained, the selection apparatus 702 can calculate the similarity degree between the candidate application and the first application according to the distance.

In the embodiment, each node in the first topology can be assigned a weight, where a weight for a node indicated by the current ticket can be assigned a larger weight, whereas a weight for a node which is not indicated by the current ticket can be assigned a smaller weight. The selection apparatus 702 can multiply the distance between the each node, except for the node corresponding to the first application, in the first topology and the corresponding node in the candidate topology by a weight for the each node, so as to obtain a weighted distance corresponding to the each node. Then, the selection apparatus 702 can calculate the similarity degree between the candidate application and the first application based on a sum of the weighted distances corresponding to the respective nodes, except for the node corresponding to the first application, in the first topology. For example, the similarity degree between the candidate application and the first application can be calculated as a difference between 1 and a sum of the weighted distances corresponding to the respective nodes, except for the node corresponding to the first application, in the first topology.

In this way, the selection apparatus 702 can determine the similarity degree between each candidate application and the first application. Then, the selection apparatus 702 can select at least one candidate application, a similarity degree between which and the first application is greater than the first threshold, from the plurality of candidate applications, as the second application relevant to the first application. The first threshold can be set according to actual needs.

The search apparatus 703 can search tickets associated with the second application for the ticket relevant to the current ticket. In the embodiment, the ticket relevant to the current ticket can be a ticket similar to the current ticket. The search apparatus 703 can find the ticket similar to the current ticket in various manners. Specifically, the search apparatus 703 can generate a replacement ticket by replacing names of at least one component included in the current ticket, e.g. at least one component described in the context information of the current ticket, with names of corresponding components in the topology of the second application. Then, as an example, the search apparatus 703 can search for a ticket which belongs to a same topic as the replacement ticket as the ticket similar to the current ticket. As another example, the search apparatus 703 can search for a ticket which has a similarity degree with the replacement ticket greater than a threshold (i.e. the fourth threshold) as the ticket similar to the current ticket. The fourth threshold can be any suitable value set as needed.

With the above device, when the incident occurs in the server system, tickets associated with other applications than the current application can be searched for a similar ticket to the current ticket, so that more suitable ticket can be found to help to solve the incident indicated in the current ticket.

The respective embodiments for implementing the method of the present disclosure have been described with reference to the accompanying drawings hereinbefore. Those skilled in the art can understand that the above method can be implemented in software, in hardware, or in a combination thereof. Further, those skilled in the art can understand that by implementing the respective steps in the above method in software, in hardware, or in a combination thereof, a device for searching for a ticket relevant to a current ticket based on the same inventive concept can be provided. Even if a hardware configuration of the device is the same as that of a general-purpose processing device, the device will exhibit characteristics different from the general-purpose processing device due to a function of software contained therein, so as to form the device according to the embodiment of the present disclosure. The device of the present disclosure includes a plurality of units or modules, which are configured to execute corresponding steps. Those skilled in the art can understand how to write a program to implement actions of the units or modules by reading the present specification.

The present invention can be a system, a method, and/or a computer program product. The computer program product can include a computer readable storage medium (or media) having computer readable program instructions thereon for causing a processor to carry out aspects of the present invention. For example, a computer program product for searching for a ticket relevant to a current ticket can include a computer readable storage medium having thereon first program instructions, second program instructions and third program instructions. The first program instructions are executable by a processor to cause the processor to extract a topology of a first application of a server system indicated by the current ticket. The second program instructions are executable by the processor to cause the processor to select a second application relevant to the first application from a plurality of candidate applications of the server system, according to the topology. The third program instructions are executable by the processor to cause the processor to search tickets associated with the second application for the ticket relevant to the current ticket. When the second application relevant to the first application is to be selected from a plurality of candidate applications of the server system, according to the topology, a similarity degree between each candidate application and the first application can be calculated according to the topology, then at least one candidate application, a similarity degree between which and the first application is greater than a first threshold, can be selected from the plurality of candidate applications, as the second application relevant to the first application.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of at least one programming language, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes at least one executable instruction for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for searching for a ticket relevant to a current ticket describing an incident, comprising:
extracting a topology of a first application of a server system, the first application being indicated by the current ticket;
selecting a second application relevant to the first application from a plurality of candidate applications of the server system, according to the topology; and
searching tickets associated with the second application for the ticket relevant to the current ticket,
wherein the selecting a second application relevant to the first application from a plurality of candidate applications of the server system, according to the topology, comprises:
calculating a similarity degree between each candidate application and the first application according to the topology, wherein the calculating a similarity degree between each candidate application and the first application according to the topology comprises:
determining a corresponding node in a topology of the candidate application for each node in the topology of the first application;
calculating a distance between the each node, except for a node corresponding to the first application, in the topology of the first application and the corresponding node in a topology of the candidate application; and
calculating the similarity degree between the candidate application and the first application according to the distance between the each node, except for the node corresponding to the first application, in the topology of the first application and the corresponding node in a topology of the candidate application.

2. The method of claim 1, wherein the selecting a second application relevant to the first application from a plurality of candidate applications of the server system, according to the topology further comprises:
selecting at least one candidate application, a similarity degree between which and the first application is greater than a first threshold, from the plurality of candidate applications, as the second application relevant to the first application.

3. The method of claim 2, wherein the calculating a distance between the each node, except for the node corresponding to the first application, in the topology of the first application and the corresponding node in a topology of the candidate application comprises:
determining a first set including tickets related to the each node, except for the node corresponding to the first application, in the topology of the first application in tickets associated with the first application, a second set including tickets related to the corresponding node in tickets associated with the candidate application, a third set including tickets unrelated to the each node, except for the node corresponding to the first application, in the topology of the first application in tickets associated with the first application, and a fourth set including tickets unrelated to the corresponding node in tickets associated with the candidate application;
determining tickets in the second set which are relevant to the tickets in the first set, and tickets in the fourth set which are relevant to the tickets in the third set; and
calculating the distance between the each node, except for the node corresponding to the first application, in the topology of the first application and the corresponding node in a topology of the candidate application according to a number of the tickets in the second set which are relevant to the tickets in the first set and a number of the tickets in the fourth set which are relevant to the tickets in the third set.

4. The method of claim 3, wherein the determining tickets in the second set which are relevant to the tickets in the first set, and tickets in the third set which are relevant to the tickets in the fourth set comprises:
calculating a distance between each ticket in the second set and each ticket in the first set;
determining a ticket in the second set as a ticket which is relevant to a ticket in the first set in response to a distance between the two tickets being less than a second threshold;
calculating a distance between each ticket in the third set and each ticket in the fourth set; and
determining a ticket in the fourth set as a ticket which is relevant to a ticket in the third set in response to a distance between the two tickets being less than a third threshold.

5. The method of claim 4, wherein the second threshold is greater than the third threshold.

6. The method of claim 1, wherein the calculating the similarity degree between the candidate application and the first application according to the distance between the each node, except for the node corresponding to the first application, in the topology of the first application and the corresponding node in a topology of the candidate application comprises:
multiplying the distance between the each node, except for the node corresponding to the first application, in the topology of the first application and the corresponding node in a topology of the candidate application by a weight for the each node, to obtain a weighted distance corresponding to the each node; and
calculating the similarity degree between the candidate application and the first application based on a sum of weighted distances corresponding to the respective nodes, except for the node corresponding to the first application, in the topology of the first application.

7. The method of claim 6, wherein in the topology of the first application, a weight for a node which is indicated by the current ticket is greater than a weight for a node which is not indicated by the current ticket.

8. The method of claim 1, wherein the searching tickets associated with the second application for the ticket relevant to the current ticket comprising:
generating a replacement ticket by replacing names of at least one component included in the current ticket with names of corresponding components in the second application; and
searching the tickets associated with the second application for a ticket belonging to a same topic as the replacement ticket or a ticket having a similarity degree with the replacement ticket greater than a fourth threshold, as the ticket relevant to the current ticket.

9. A system for searching for a ticket relevant to a current ticket describing an incident, comprising:
at least one processor;
a memory coupled to at least one of the processors; and
a set of computer program instructions stored in the memory which, when executed by at least one of the processors, performs the steps of a method comprising:

extracting a topology of a first application of a server system, the first application being indicated by the current ticket;

selecting a second application relevant to the first application from a plurality of candidate applications of the server system, according to the topology; and searching tickets associated with the second application for the ticket relevant to the current ticket, wherein the selecting a second application relevant to the first application from a plurality of candidate applications of the server system according to the topology, comprises:

calculating a similarity degree between each candidate application and the first application according to the topology, wherein the calculating a similarity degree between each candidate application and the first application according to the topology, comprises:

determining a corresponding node in a topology of the candidate application for each node in the topology of the first application;

calculating a distance between the each node, except for a node corresponding to the first application, in the topology of the first application and the corresponding node in a topology of the candidate application; and calculating the similarity degree between the candidate application and the first application according to the distance between the each node, except for the node corresponding to the first application, in the topology of the first application and the corresponding node in a topology of the candidate application.

10. The system of claim 9, wherein the selecting a second application relevant to the first application from a plurality of candidate applications of the server system according to the topology, further comprises:

selecting at least one candidate application, a similarity degree between which and the first application is greater than a first threshold, from the plurality of candidate applications, as the second application relevant to the first application.

11. The system of claim 10, wherein the calculating a distance between the each node, except for the node corresponding to the first application, in the topology of the first application and the corresponding node in a topology of the candidate application comprises:

determining a first set including tickets related to the each node, except for the node corresponding to the first application, in the topology of the first application in tickets associated with the first application, a second set including tickets related to the corresponding node in tickets associated with the candidate application, a third set including tickets unrelated to the each node, except for the node corresponding to the first application, in the topology of the first application in tickets associated with the first application, and a fourth set including tickets unrelated to the corresponding node in tickets associated with the candidate application;

determining tickets in the second set which are relevant to the tickets in the first set, and tickets in the fourth set which are relevant to the tickets in the third set; and calculating the distance between the each node, except for the node corresponding to the first application, in the topology of the first application and the corresponding node in a topology of the candidate application according to a number of the tickets in the second set which are relevant to the tickets in the first set and a number of the tickets in the fourth set which are relevant to the tickets in the third set.

12. The system of claim 11, wherein the determining tickets in the second set which are relevant to the tickets in the first set, and tickets in the third set which are relevant to the tickets in the fourth set comprises:

calculating a distance between each ticket in the second set and each ticket in the first set;

determining a ticket in the second set as a ticket which is relevant to a ticket in the first set in response to a distance between the two tickets being less than a second threshold;

calculating a distance between each ticket in the third set and each ticket in the fourth set; and determining a ticket in the fourth set as a ticket which is relevant to a ticket in the third set in response to a distance between the two tickets being less than a third threshold.

13. The system of claim 12, wherein the second threshold is greater than the third threshold.

14. The system of claim 9, wherein the calculating the similarity degree between the candidate application and the first application according to the distance between the each node, except for the node corresponding to the first application, in the topology of the first application and the corresponding node in a topology of the candidate application comprises:

multiplying the distance between the each node, except for the node corresponding to the first application, in the topology of the first application and the corresponding node in a topology of the candidate application by a weight for the each node, to obtain a weighted distance corresponding to the each node; and calculating the similarity degree between the candidate application and the first application based on a sum of weighted distances corresponding to the respective nodes, except for the node corresponding to the first application, in the topology of the first application.

15. The system of claim 14, wherein in the topology of the first application, a weight for a node which is indicated by the current ticket is greater than a weight for a node which is not indicated by the current ticket.

16. The system of claim 9, wherein the searching tickets associated with the second application for the ticket relevant to the current ticket comprising:

generating a replacement ticket by replacing names of at least one component included in the current ticket with names of corresponding components in the second application; and searching the tickets associated with the second application for a ticket belonging to a same topic as the replacement ticket or a ticket having a similarity degree with the replacement ticket greater than a fourth threshold, as the ticket relevant to the current ticket.

17. A computer program product for searching for a ticket relevant to a current ticket describing an incident, comprising:

a computer readable storage medium having thereon:

first program instructions executable by a processor to cause the processor to extract a topology of a first application of a server system, the first application being indicated by the current ticket;

second program instructions executable by the processor to cause the processor to select a second application relevant to the first application from a plurality of candidate applications of the server system, according to the topology; and third program instructions executable by the processor to cause the processor to search tickets associated with the second application for the ticket relevant to the current ticket, wherein executing the second program instructions by the processor to cause the processor to select a second application relevant to the first application from a plurality of candidate applications of the server system, according to the topology, comprises:

calculating a similarity degree between each candidate application and the first application according to the topology, wherein the calculating a similarity degree between each candidate application and the first application according to the topology comprises:

determining a corresponding node in a topology of the candidate application for each node in the topology of the first application;

calculating a distance between the each node, except for a node corresponding to the first application, in the topology of the first application and the corresponding node in a topology of the candidate application; and calculating the similarity degree between the candidate application and the first application according to the distance between the each node, except for the node corresponding to the first application, in the topology of the first application and the corresponding node in a topology of the candidate application.

18. The computer program product of claim 17, wherein the selecting a second application relevant to the first application from a plurality of candidate applications of the server system, according to the topology further comprises:

selecting at least one candidate application, a similarity degree between which and the first application is greater than a first threshold, from the plurality of candidate applications, as the second application relevant to the first application.

* * * * *